United States Patent
Simonin et al.

(10) Patent No.: US 10,247,216 B2
(45) Date of Patent: Apr. 2, 2019

(54) FASTENERLESS ANTI-PEEL ADHESIVE JOINT

(71) Applicant: GM GLOBAL TECHNOLOGY OPERATIONS LLC, Detroit, MI (US)

(72) Inventors: Matthew P. Simonin, Ortonville, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 15/481,863

(22) Filed: Apr. 7, 2017

(65) Prior Publication Data
US 2018/0291940 A1    Oct. 11, 2018

(51) Int. Cl.
| F16B 11/00 | (2006.01) |
| B32B 7/12 | (2006.01) |
| B29C 65/00 | (2006.01) |
| B62D 27/02 | (2006.01) |
| F16B 5/07 | (2006.01) |

(52) U.S. Cl.
CPC .............. *F16B 11/006* (2013.01); *B32B 7/12* (2013.01); *B29C 66/7212* (2013.01); *B62D 27/026* (2013.01); *F16B 5/07* (2013.01)

(58) Field of Classification Search
None
See application file for complete search history.

(56) References Cited

U.S. PATENT DOCUMENTS

| 6,176,959 B1 * | 1/2001 | Clarke ................. B08B 7/0042 156/272.8 |
| 6,486,256 B1 * | 11/2002 | Tarbutton ............. C08G 59/182 525/65 |
| 6,749,155 B2 * | 6/2004 | Bergmann ................ B64C 1/06 244/133 |

\* cited by examiner

*Primary Examiner* — Jeffrey D Washville
(74) *Attorney, Agent, or Firm* — Quinn IP Law

(57) ABSTRACT

A fastenerless anti-peel adhesive joint includes a first part having a first surface and forming a first anti-peel feature including a first anti-peel surface, a second part having a second surface and forming a second anti-peel feature including a second anti-peel surface, and an adhesive disposed between the first and second surfaces and within the first and second anti-peel features. The adhesive connects the parts via adhesive bonds at the first and second surfaces and at the first and second anti-peel surfaces. The first and second anti-peel features are configured to load the adhesive bonds at the first and second anti-peel surfaces in shear stress when the fastenerless anti-peel adhesive joint is subjected to a peel force that is normal to the first and second surfaces such that the shear strength of the adhesive bonds at the first and second anti-peel surfaces prevents the parts from being peeled apart.

20 Claims, 3 Drawing Sheets

FASTENERLESS ANTI-PEEL ADHESIVE JOINT

INTRODUCTION

An adhesive joint may include a first part, a second part, and an adhesive. The adhesive may form an adhesive bond with the first and second parts. The adhesive joint may include a peel stopping mechanical fastener, extending across the adhesive joint. The peel stopping mechanical fastener may prevent the adhesive joint from being peeled apart under loading, since the adhesive bond with the first and second parts may have a low peel strength. The peel stopping mechanical fastener may be visible from an exterior of the adhesive joint. This disclosure relates to a fastenerless anti-peel adhesive joint.

SUMMARY

A fastenerless anti-peel adhesive joint, a vehicle, and a method are disclosed herein. The fastenerless anti-peel adhesive joint includes a first part, a second part, and an adhesive. The first part has a first surface and forms a first anti-peel feature. The first anti-peel feature includes a first anti-peel surface. The second part has a second surface and forms a second anti-peel feature. The second anti-peel feature includes a second anti-peel surface. The adhesive is disposed between the first and second surfaces and within the first and second anti-peel features. The adhesive connects the first part to the second part via adhesive bonds at the first and second surfaces and at the first and second anti-peel surfaces. The first and second anti-peel features are configured to load the adhesive bonds at the first and second anti-peel surfaces in shear stress when the anti-peel adhesive joint is subjected to a peel force that is normal to the first and second surfaces such that the shear strength of the adhesive bonds at the first and second anti-peel surfaces prevents the first and second parts from being peeled apart. The fastenerless anti-peel adhesive joint may not include a peel stopping mechanical fastener.

One of the first and second anti-peel features may be a channel formed in the respective part. The channel may have a width and a depth. The channel may be a cylindrical hole. Alternatively, the channel may be a groove having a length. The length of the channel may be greater than the width of the channel.

The adhesive may include a plurality of reinforcing fibers. At least one of the plurality of reinforcing fibers may extend from the adhesive disposed within the first anti-peel feature to the adhesive disposed within the second anti-peel feature such that the first and second parts are bridged by the at least one of the plurality of reinforcing fibers. The plurality of reinforcing fibers may be made of a carbon material.

One of the first and second anti-peel surfaces may not be perpendicular to the respective surface of the respective part such that the adhesive in the respective anti-peel feature forms an anchor that prevents the first and second parts from being peeled apart by the transverse peel force. The first anti-peel surface may be aligned with the second anti-peel surface. Alternatively, the first anti-peel surface may be offset from the second anti-peel surface by an offset distance.

The first part may have a first opposite surface. The second part may have a second opposite surface. One of the first and second anti-peel features may extend internally through the respective part to the respective opposite surface. The adhesive may form an anti-peel cap having a thickness and extending from the respective anti-peel feature and over the respective opposite surface of the respective part such that the adhesive in the anti-peel cap forms an anchor that prevents the first and second parts from being peeled apart by the transverse peel force.

The vehicle includes a fastenerless anti-peel adhesive joint. The fastenerless anti-peel adhesive joint includes a first part, a second part, and an adhesive. The first part has a first surface and forms a first anti-peel feature. The first anti-peel feature includes a first anti-peel surface. The second part has a second surface and forms a second anti-peel feature. The second anti-peel feature includes a second anti-peel surface. The adhesive is disposed between the first and second surfaces and within the first and second anti-peel features. The adhesive connects the first part to the second part via adhesive bonds at the first and second surfaces and at the first and second anti-peel surfaces. The first and second anti-peel features are configured to load the adhesive bonds at the first and second anti-peel surfaces in shear stress when the anti-peel adhesive joint is subjected to a peel force that is normal to the first and second surfaces such that the shear strength of the adhesive bonds at the first and second anti-peel surfaces prevents the first and second parts from being peeled apart. The fastenerless anti-peel adhesive joint does not include a peel stopping mechanical fastener.

One of the first and second anti-peel features may be a channel formed in the respective part. The channel may have a width and a depth. The adhesive may include a plurality of reinforcing fibers. At least one of the plurality of reinforcing fibers may extend from the adhesive disposed within the first anti-peel feature to the adhesive disposed within the second anti-peel feature such that the first and second parts are bridged by the at least one of the plurality of reinforcing fibers. The plurality of reinforcing fibers may be made of a carbon material.

One of the first and second anti-peel surfaces may not be perpendicular to the respective surface of the respective part such that the adhesive in the respective anti-peel feature forms an anchor that prevents the first and second parts from being peeled apart by the transverse peel force.

The first part may have a first opposite surface. The second part may have a second opposite surface. One of the first and second anti-peel features may extend internally through the respective part to the respective opposite surface. The adhesive may form an anti-peel cap having a thickness and extending from the respective anti-peel feature and over the respective opposite surface of the respective part such that the adhesive in the anti-peel cap forms an anchor that prevents the first and second parts from being peeled apart by the transverse peel force.

The method is provided for adhesively assembling parts without a potentially visible fastener. The method includes: configuring a first part with a first planar portion and a first channel portion; configuring a second part with a second planar portion and a second channel portion; spacing the first part with respect to the second part so that the first and second planar portions are juxtaposed to each other; and injecting an adhesive into the space between the first and second parts sufficient to squeeze out and pool in the space where the first and second parts are juxtaposed to each other and at least partially fill the first and second channel portions where the channel portions are in communication with each other such that peeling of the first part from the second part is prevented when the assembled parts are subjected to a peel force that is normal to the first and second planar portions.

The fastenerless anti-peel adhesive joint, the vehicle, and the method disclosed herein utilize the shear strength of the adhesive bonds at the first and second anti-peel surfaces to prevent the joint from being peeled apart without the need for a potentially visible peel stopping fastener. This disclosure applies to any machine or manufacture including an adhesive joint. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, etc.

The above features and advantages and other features and advantages of the present disclosure are readily apparent from the following detailed description of the best modes for carrying out the disclosure when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
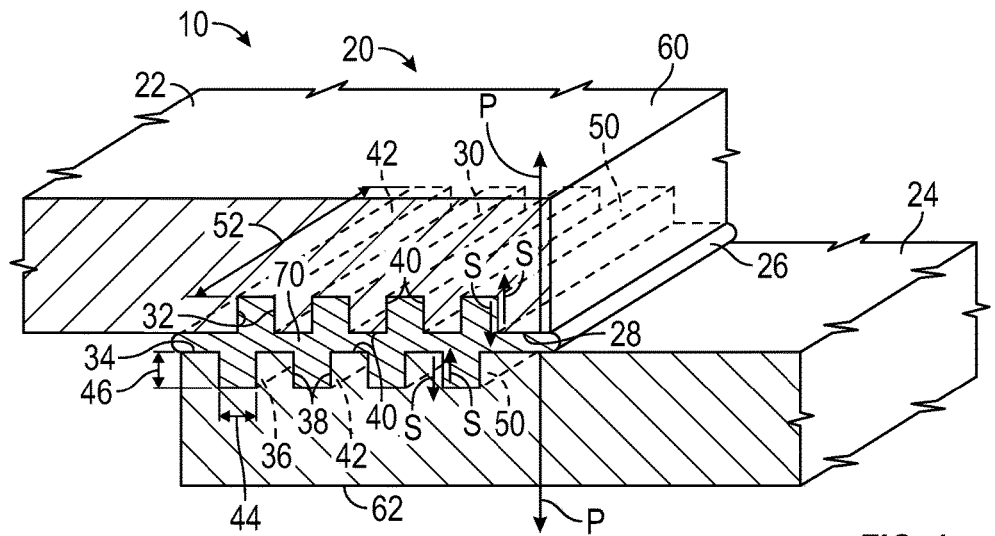
FIG. 1 is a fragmentary, schematic, cross-sectional illustration, partially in elevation, of a vehicle having an example fastenerless anti-peel adhesive joint of the type disclosed herein.

Referring to the drawings, wherein like reference numbers refer to like components throughout the views, FIG. 1 shows an example fastenerless anti-peel adhesive joint 20 of the type disclosed herein. The fastenerless anti-peel adhesive joint 20 is included in a vehicle 10. While the vehicle 10 is an example application suitable for the fastenerless anti-peel adhesive joint 20 disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the fastenerless anti-peel adhesive joint 20 to such an embodiment.

Referring now to FIGS. 1-8, the example vehicle 10 includes a fastenerless anti-peel adhesive joint 20. The fastenerless anti-peel adhesive joint 20 includes a first part 22, a second part 24, and an adhesive 26. The first part 22 has a first surface 28 and forms a first anti-peel feature 30. The first anti-peel feature 30 extends internally from the first surface 28 into the first part 22 and includes a first anti-peel surface 32. The second part 24 has a second surface 34 and forms a second anti-peel feature 36. The second anti-peel feature 36 extends internally from the second surface 34 into the second part 24 and includes a second anti-peel surface 38. The first and second anti-peel features 30, 36 may form a cavity or a hole in the respective first and second part 22, 24 having an opening on the respective first and second surface 28, 34, as shown. The first and second anti-peel surfaces 32, 38 may be substantially perpendicular to the respective first and second surface 28, 34.

The adhesive 26 is disposed between the first and second surfaces 28, 34 in a space 70 between the parts 22, 24 and within the first and second anti-peel features 30, 36. The adhesive 26 connects the first part 22 to the second part 24 via adhesive bonds 40 at the first and second surfaces 28, 34 and at the first and second anti-peel surfaces 32, 38.

Referring now specifically to FIG. 1, the first and second anti-peel features 30, 36 are configured to load the adhesive bonds 40 at the first and second anti-peel surfaces 32, 38 in shear stress (arrows S) when the anti-peel adhesive joint 20 is subjected to a transverse peel force (arrows P) that is normal to the first and second surfaces 28, 34 such that the shear strength of the adhesive bonds 40 at the first and second anti-peel surfaces 32, 38 prevents the first and second parts 22, 24 from being peeled apart. The transverse peel force (arrows P) is defined as a force that applies a peel, pull apart, or tensile stress (arrows P) to the adhesive 26 and to the adhesive bonds 40 at the first and second surfaces 28, 34 in a transverse or normal direction (arrows P) to the first and second surfaces 28, 34.

The adhesive bonds 40 have greater shear strength when loaded in shear stress (arrows S) than peel strength when loaded in peel or tensile stress (arrows P). Thus, the greater shear strength of the adhesive bonds 40 at the first and second anti-peel surfaces 32, 38 compared to the lesser peel strength of the adhesive bonds 40 at the first and second surfaces 28, 34 prevents the first and second parts 22, 24 from being peeled apart. The fastenerless anti-peel adhesive joint 20 may not include a potentially visible, peel stopping mechanical fastener (not shown), that extends across the first part 22, the second part 24, and the adhesive 26, attaching the first part 22 to the second part 24.

Stress is defined herein as a force divided by an area of a part on which the force acts. Shear stress (arrows S) is defined herein as a stress where the force is parallel to the area on which it acts. Peel or tensile stress (arrows P) is defined herein as a stress where the force is normal to the area on which it acts and acts to pull on the area on which it acts. Shear strength is defined herein as the maximum shear stress that the area of the part can sustain without being pulled apart. Peel or tensile strength is defined herein as the maximum peel or tensile stress that the area of the part can sustain without being pulled apart. In this case, the part is the fastenerless anti-peel adhesive joint 20 and the areas of interest of the part on which the forces act are the areas of the adhesive bonds 40 at the first and second anti-peel features 32, 38 and the areas of the adhesive bonds 40 at the first and second surfaces 28, 34.

Figure 5:
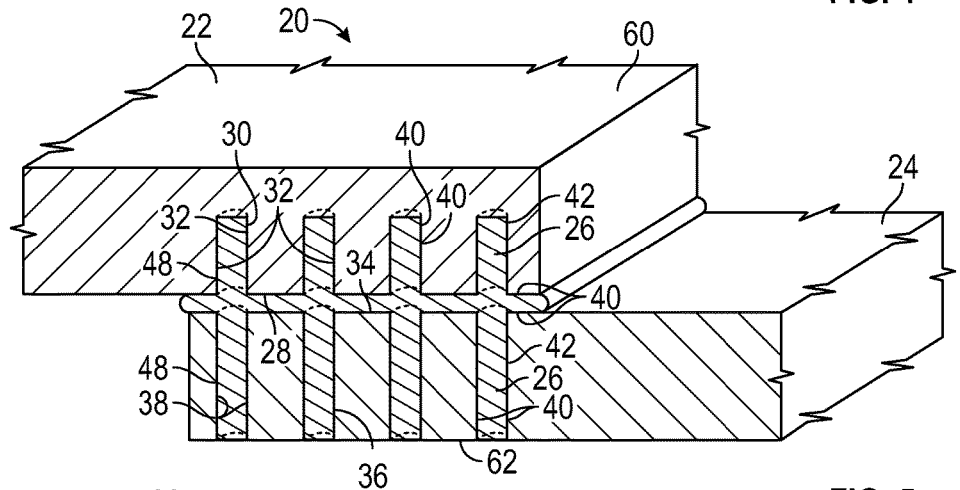
FIG. 5 is a fragmentary, schematic, cross-sectional illustration, partially in elevation, of a fifth example of the fastenerless anti-peel adhesive joint.
Figure 6:
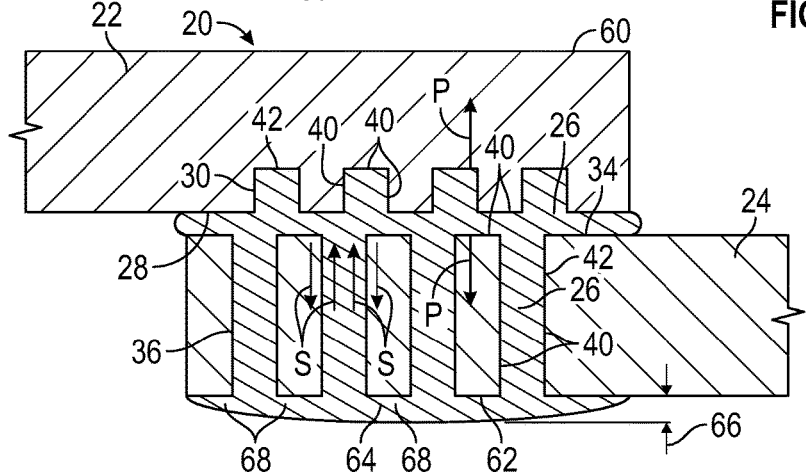
FIG. 6 is a schematic, cross-sectional illustration of a sixth example of the fastenerless anti-peel adhesive joint.

One of the first and second anti-peel features 32, 38 may be a channel 42 formed in the respective part 22, 24. The channel 42 may have a width 44 and a depth 46. The channel 42 may be a cylindrical hole 48, as best seen in FIG. 5. Alternatively, the channel 42 may be a groove 50, further having a length 52, as best seen in FIG. 1. The length 52 of the channel 42 may be greater than the width 44 of the channel 42.

Figure 4:
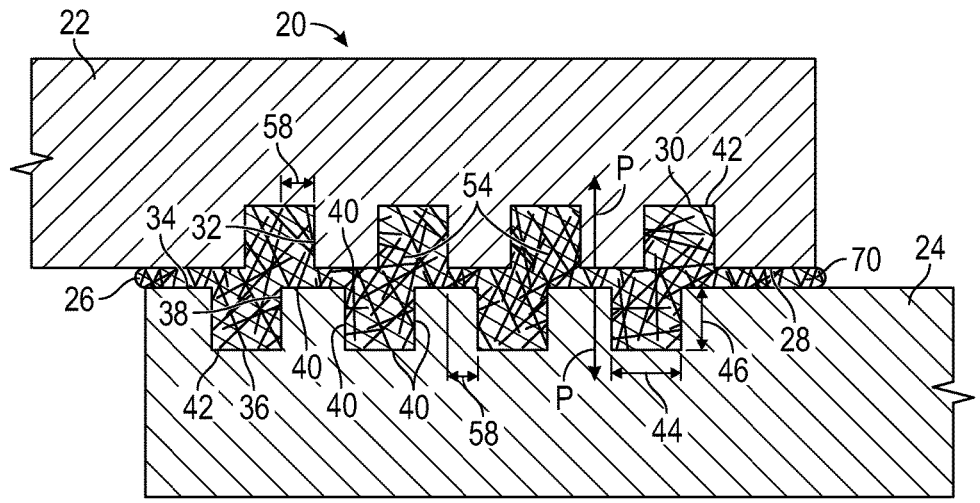
FIG. 4 is a schematic, cross-sectional illustration of a fourth example of the fastenerless anti-peel adhesive joint.
Figure 8:
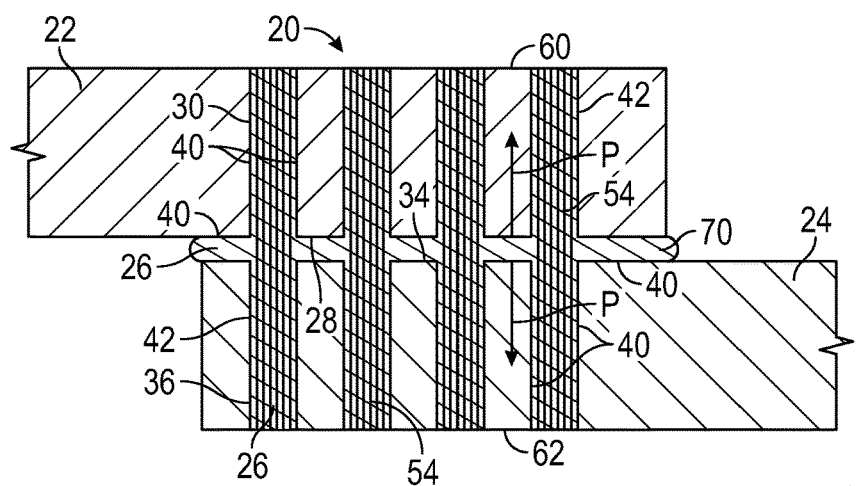
FIG. 8 is a schematic, cross-sectional illustration of an eighth example of the fastenerless anti-peel adhesive joint.

Referring now to FIGS. 4 and 8, the adhesive 26 may include a plurality of reinforcing fibers 54. The plurality of reinforcing fibers 54 may form a network of fibers, as shown. The network of fibers may be randomly aligned, as shown in FIG. 4, or unidirectionally aligned, as shown in FIG. 8. At least one of the plurality of reinforcing fibers 54 may extend from the adhesive 26 disposed within the first anti-peel feature 30 to the adhesive 26 disposed within the second anti-peel feature 36 such that the first and second parts 22, 24 are bridged by the one of the plurality of reinforcing fibers 54, as shown in FIGS. 4 and 8. The plurality of reinforcing fibers 54 may be made of a carbon material, such as graphite, a glass material, such as fiberglass, or another material suitable for reinforcement of the adhesive 26.

Figure 2:
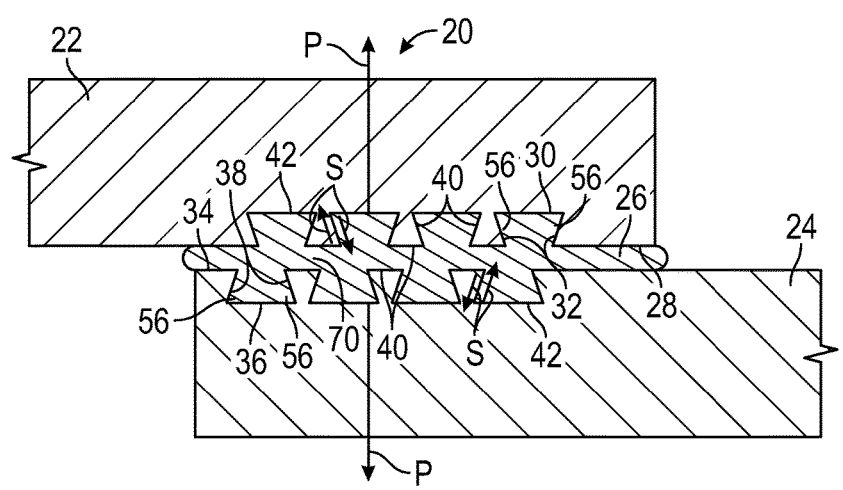
FIG. 2 is a schematic, cross-sectional illustration of a second example of the fastenerless anti-peel adhesive joint.
Figure 3:
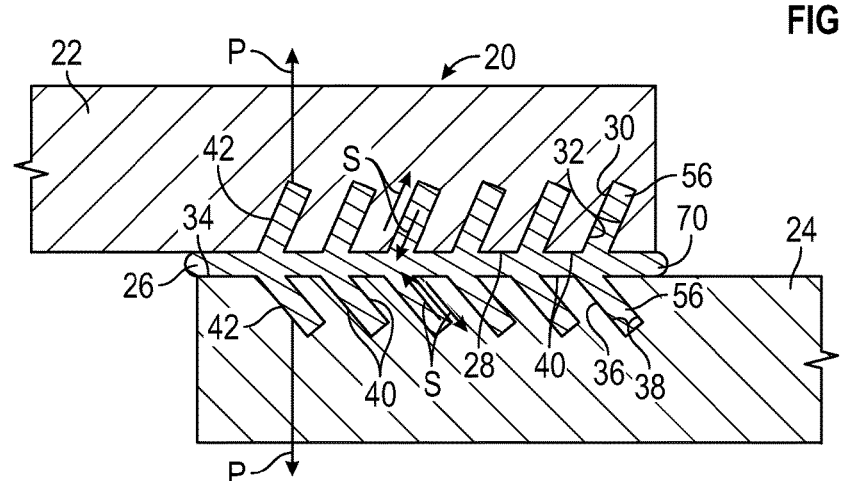
FIG. 3 is a schematic, cross-sectional illustration of a third example of the fastenerless anti-peel adhesive joint.
Figure 7:
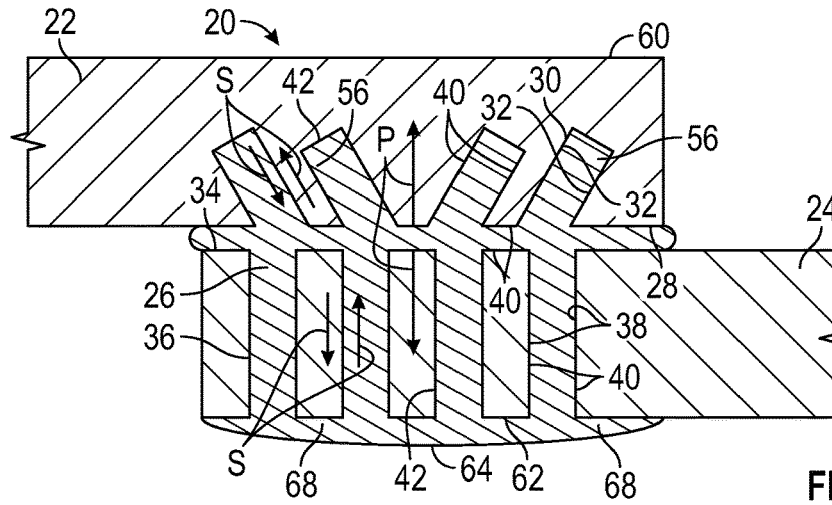
FIG. 7 is a schematic, cross-sectional illustration of a seventh example of the fastenerless anti-peel adhesive joint.

Referring now to FIGS. 1 and 4-8, one of the first and second anti-peel surfaces 32, 38 may be perpendicular to the respective surface 28, 34 of the respective part 22, 24. Alternatively, one of the first and second anti-peel surfaces 32, 38 may not be perpendicular to the respective surface 28, 34 of the respective part 22, 24 such that the adhesive 26 in the respective anti-peel feature 30, 36 forms a mechanical lock or anchor 56 that prevents the first and second parts 22, 24 from being peeled apart by the transverse peel force (arrows P), as shown in FIGS. 2, 3, and 7. The mechanical lock or anchor 56 causes interference between the adhesive 26 in the respective anti-peel feature 30, 36 and the respective part 22, 24 preventing the first and second parts 22, 24 from being peeled apart by the transverse peel force (arrows P).

The anchor 56 may supplement the shear strength of the adhesive 26 in the adhesive bonds 40 at the respective first and second anti-peel surfaces 32, 38 to prevent the first and second parts 22, 24 from being peeled apart by the transverse peel force (arrows P). Both of the first and second anti-peel surfaces 32, 38 may not be perpendicular to the respective surface 28, 34 of the respective part 22, 24 such that the adhesive 26 in both of the anti-peel feature 30, 36 forms a mechanical lock or anchor 56 that prevents the first and second parts 22, 24 from being peeled apart by the transverse peel force (arrows P), as shown in FIGS. 2 and 3.

Referring now to FIGS. 3, 5, and 8, the first anti-peel surface 32 may be aligned with, flush with, or directly opposed to the second anti-peel surface 38 at the first and second surfaces 28, 34. Referring now to FIGS. 1, 2, 4, and 6, the first anti-peel surface 32 may be offset from the second anti-peel surface 38 by an offset distance 58 at the first and second surfaces 28, 34, as best seen in FIG. 4.

Referring now to FIGS. 5-8, the first part 22 may have a first opposite surface 60. The second part 24 may have a second opposite surface 62. One of the first and second anti-peel features 30, 36 may extend internally through the respective part 22, 24 to the respective opposite surface 60, 62.

The adhesive 26 may pool on one of the respective opposite surfaces 60, 62 to form an anti-peel cap 64 having a thickness 66 and extending from the respective anti-peel feature 30, 36 and over the respective opposite surface 60, 62 of the respective part 22, 24 such that the adhesive 26 in the anti-peel cap 64 forms a mechanical lock or anchor 68 that prevents the first and second parts 22, 24 from being peeled apart by the transverse peel force (arrows P). The mechanical lock or anchor 68 causes interference between the adhesive 26 in the anti-peel cap 64 and the respective part 22, 24 preventing the first and second parts 22, 24 from being peeled apart by the transverse peel force (arrows P). The anti-peel cap 64 may be formed on both of the opposite surfaces 60, 62 of the parts 22, 24.

Referring now specifically to FIG. 8, The reinforcing fiber 54 that may be included in the adhesive 26 may extend from the first opposite surface 60 of the first part 22 to the second opposite surface 62 of the second part 24.

Referring now to FIGS. 4 and 8, the plurality of reinforcing fibers 54 may prevent a separation of the adhesive bond 40 at one of the first and second surfaces 28, 34, induced by the peel stress (arrows P), from extending though the adhesive 26 such that the anti-peel features 30, 36 are prevented from being skipped over by the separation. The plurality of reinforcing fibers 54 may stop propagation of the separation of the adhesive 26 and may change the direction of the separation such that the adhesive 26 is loaded in shear stress.

Referring now to FIGS. 1-8, as will be understood by those skilled in the art, any of the configurations of the anti-peel features 30, 36 and the anchors 56, 68 described above may be combined in an anti-peel adhesive joint 20. Additional configurations of the anti-peel features 30, 36 and the anchors 56, 68 described above may be used as appropriate.

Figure 9:
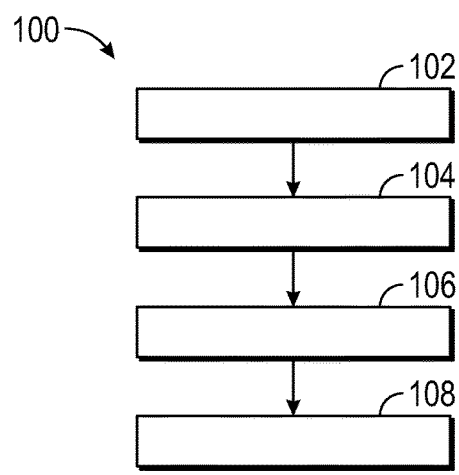
FIG. 9 is a flowchart of an example method of adhesively assembling parts without a potentially visible fastener of the type disclosed herein.

Referring now to FIG. 9, a method 100 is provided for adhesively assembling parts 22, 24 without a potentially visible fastener. The method 100 includes, at step 102, configuring a first part 22 with a first planar portion 28 and a first channel portion 30. Step 104 of the method 100 includes, configuring a second part 24 with a second planar portion 34 and a second channel portion 36.

Step 106 of the method 100 includes, spacing the first part 22 with respect to the second part 24 so that the first and second planar portions 28, 34 are juxtaposed to each other and the first and second channel portions 30, 36 are in communication with each other. Step 108 of the method 100 includes, injecting or applying an adhesive 26 into the space 70 between the first and second parts 22, 24 sufficient to squeeze out and pool in the space 70 where the first and second parts 22, 24 are juxtaposed to each other and at least partially fill the first and second channel portions 30, 36 where the channel portions 30, 36 are in communication with each other such that peeling of the first part 22 from the second part 24 is prevented when the assembled parts 20 are subjected to a transverse peel force (arrows P).

The method 100 applies to each of the examples of the fastenerless anti-peel adhesive joint 20 described above. The adhesive 26 may be applied to one of the surfaces or planar portions 28, 34. Alternatively, the adhesive 26 may be injected into at least one of the anti-peel features 30, 36 at the respective opposite surface 60, 62 when the at least one of the anti-peel features 30, 36 extends internally through the respective part 22, 24 to the respective opposite surface 60, 62.

While the best modes for carrying out the disclosure have been described in detail, those familiar with the art to which this disclosure relates will recognize various alternative designs and embodiments for practicing the disclosure within the scope of the appended claims.

What is claimed is:

1. A fastenerless anti-peel adhesive joint, comprising:
   a first part having a first surface and forming a first anti-peel feature extending internally from the first surface into the first part, the first anti-peel feature including a first anti-peel surface substantially perpendicular to the first surface;
   a second part having a second surface and forming a second anti-peel feature extending internally from the second surface into the second part, the second anti-peel feature including a second anti-peel surface substantially perpendicular to the second surface; and an adhesive disposed between the first and second surfaces and within the first and second anti-peel features, the adhesive connecting the first part to the second part via adhesive bonds at the first and second surfaces and at the first and second anti-peel surfaces;

wherein the first and second anti-peel features are configured to load the adhesive bonds at the first and second anti-peel surfaces in shear stress when the fastenerless anti-peel adhesive joint is subjected to a peel force that is normal to the first and second surfaces such that the shear strength of the adhesive bonds at the first and second anti-peel surfaces prevents the first and second parts from being peeled apart.

2. The fastenerless anti-peel adhesive joint of claim 1, wherein one of the first and second anti-peel features is further defined as a channel formed in the respective part, the channel having a width and a depth.

3. The fastenerless anti-peel adhesive joint of claim 2, wherein the channel is further defined as a cylindrical hole formed in the respective part.

4. The fastenerless anti-peel adhesive joint of claim 2, wherein the channel is further defined as a groove having a length; and
wherein the length is greater than the width.

5. The fastenerless anti-peel adhesive joint of claim 1, wherein the adhesive includes a plurality of reinforcing fibers; and
wherein at least one of the plurality of reinforcing fibers extends from the adhesive disposed within the first anti-peel feature to the adhesive disposed within the second anti-peel feature such that the first and second parts are bridged by the at least one of the plurality of reinforcing fibers.

6. The fastenerless anti-peel adhesive joint of claim 5, wherein the plurality of reinforcing fibers are made of carbon.

7. The fastenerless anti-peel adhesive joint of claim 1, wherein one of the first and second anti-peel surfaces is not perpendicular to the respective surface of the respective part such that the adhesive in the respective anti-peel feature forms an anchor that prevents the first and second parts from being peeled apart by the transverse peel force.

8. The fastenerless anti-peel adhesive joint of claim 1, wherein the first anti-peel surface is aligned with the second anti-peel surface.

9. The fastenerless anti-peel adhesive joint of claim 1, wherein the first anti-peel surface is offset from the second anti-peel surface by an offset distance.

10. The fastenerless anti-peel adhesive joint of claim 1, wherein the first part has a first opposite surface;
wherein the second part has a second opposite surface; and
wherein one of the first and second anti-peel features extends internally through the respective part to the respective opposite surface.

11. The fastenerless anti-peel adhesive joint of claim 10, wherein the adhesive forms an anti-peel cap having a thickness and extending from the respective anti-peel feature and over the respective opposite surface of the respective part such that the adhesive in the anti-peel cap forms an anchor that prevents the first and second parts from being peeled apart by the transverse peel force.

12. The fastenerless anti-peel adhesive joint of claim 1, wherein the fastenerless anti-peel adhesive joint does not include a peel stopping mechanical fastener.

13. A vehicle, comprising:
a fastenerless anti-peel adhesive joint, including:
a first part having a first surface and forming a first anti-peel feature extending internally from the first surface into the first part, the first anti-peel feature including a first anti-peel surface substantially perpendicular to the first surface;
a second part having a second surface and forming a second anti-peel feature extending internally from the second surface into the second part, the second anti-peel feature including a second anti-peel surface substantially perpendicular to the second surface; and
an adhesive disposed between the first and second surfaces and within the first and second anti-peel features, the adhesive connecting the first part to the second part via adhesive bonds at the first and second surfaces and at the first and second anti-peel surfaces;
wherein the first and second anti-peel features are configured to load the adhesive bonds at the first and second anti-peel surfaces in shear stress when the fastenerless anti-peel adhesive joint is subjected to a peel force that is normal to the first and second surfaces such that the shear strength of the adhesive bonds at the first and second anti-peel surfaces prevents the first and second parts from being peeled apart; and
wherein the fastenerless anti-peel adhesive joint does not include a peel stopping mechanical fastener.

14. The vehicle of claim 13, wherein one of the first and second anti-peel features is further defined as a channel formed in the respective part, the channel having a width and a depth.

15. The vehicle of claim 13, wherein the adhesive includes a plurality of reinforcing fibers; and
wherein at least one of the plurality of reinforcing fibers extends from the adhesive disposed within the first anti-peel feature to the adhesive disposed within the second anti-peel feature such that the first and second parts are bridged by the at least one of the plurality of reinforcing fibers.

16. The vehicle of claim 15, wherein the plurality of reinforcing fibers are made of carbon.

17. The vehicle of claim 13, wherein one of the first and second anti-peel surfaces is not perpendicular to the respective surface of the respective part such that the adhesive in the respective anti-peel feature forms an anchor that prevents the first and second parts from being peeled apart by the transverse peel force.

18. The vehicle of claim 13, wherein the first part has a first opposite surface;
wherein the second part has a second opposite surface; and
wherein one of the first and second anti-peel features extends internally through the respective part to the respective opposite surface.

19. The vehicle of claim 13, wherein the adhesive forms an anti-peel cap having a thickness and extending from the respective anti-peel feature and over the respective opposite surface of the respective part such that the adhesive in the anti-peel cap forms an anchor that prevents the first and second parts from being peeled apart by the transverse peel force.

20. A method of adhesively assembling parts without a potentially visible fastener, comprising:

configuring a first part with a first planar portion and a first channel portion extending internally into the first part substantially perpendicular to the first planar portion;

configuring a second part with a second planar portion and a second channel portion extending internally into the second part substantially perpendicular to the second planar portion;

spacing the first part with respect to the second part so that the first and second planar portions are juxtaposed to each other; and injecting an adhesive into the space between the first and second parts sufficient to squeeze out and pool in the space where the first and second parts are juxtaposed to each other and at least partially fill the first and second channel portions where the channel portions are in communication with each other such that peeling of the first part from the second part is prevented when the assembled parts are subjected to a peel force that is normal to the first and second planar portions.

* * * * *